United States Patent Office 3,063,965
Patented Nov. 13, 1962

3,063,965
POLYEPOXIDE COMPOSITIONS
William G. Colclough, Jr., Somerville, N.Y., assignor to Union Carbide Corporation, a corporation of New York
No Drawing. Filed Nov. 25, 1957, Ser. No. 698,323
6 Claims. (Cl. 260—59)

This invention relates to polyepoxide compositions containing a latent acting catalyst.

Polyepoxide compositions can be cured to hard, tough, durable products having excellent chemical and electrical resistivity by admixing therewith a catalyst whereby the catalyst catalyzes the reaction between the normally reactive components of the composition, and the composition cures to an insoluble, infusible product.

Conventionally, the supplier has premixed the polyepoxide compositions with curing catalysts prior to shipping the compositions to a molder or other ultimate user for, as a rule, the ultimate user does not have the equipment required to intimately blend the catalysts with the polyepoxides. The requirement that the supplier premix the catalysts with the polyepoxide compositions has presented a serious practical problem as polyepoxide compositions containing a curing catalyst, cure to infusible, unworkable products in a relatively short time. It has been suggested that latent acting catalysts be employed with these compositions in order to obtain a composition having a long storage life and a fast cure time upon release, or activation, of the catalyst.

Up until the present time, however, the latent acting catalysts that are presently available, a composition containing these agents had a relatively short storage life. The conventional latent catalysts are of the type wherein a material which is unreactive per se is introduced into a composition and undergoes, at elevated temperatures, a self-reaction or reaction with another component of the system to form a reactive material. This reactive material, in turn, catalyzes the reaction between the normally reactive components of the composition. In actual practice, however, the current day latent acting catalysts are active even at room temperatures, with their activity increasing with increasing temperature. Consequently, as some reaction occurs even at room temperature, compositions containing these catalysts are not chemically stable and, therefore, have poor storage lives. These current-day catalysts are also undesirable because of the uncertainty and unpredictability surrounding the "in situ" chemical reaction. As an illustration, a small difference in the moisture content or pH of the composition containing these catalysts or the presence therein of a trace of an impurity can seriously affect the extent to which the reaction proceeds and, consequently, the amount of reactive material which is formed.

I have now found that the problems of premature activity at normal storage temperatures with respect to polyepoxide compositions can be overcome by utilizing a catalyst comprising hexamethylenetetramine coated with a polyethylene glycol which acts as a mechanical barrier between the hexamethylenetetramine and the polyepoxide composition.

My invention not only allows a premixing of polyepoxide compositions with the hexamethylenetetramine catalyst in controlled amounts to form compositions which are stable and therefore have a long storage life at normal storage temperatures (as the catalyst does not prematurely come into contact with the polyepoxide compositions), but is also advantageous as hexamethylenetetramine coated with a polyethylene glycol effects a faster cure of the polyepoxide composition, once the coating is made discontinuous and the hexamethylenetetramine is free to contact the aforementioned composition, than is the case when other type coating materials are used.

Generally, hexamethylenetetramine can be prepared by allowing a mixture of formalin and concentrated ammonia solution to evaporate. Hexamethylenetetramine has a polycyclic structure made up of methylene groups bridged by nitrogen atoms into a cross-linked six-membered ring.

By the term "polyethylene glycol" is meant the normally solid polyethylene glycols exemplified by the commercially available "Carbowaxes."

Generally, the polyepoxides which may be cured include those containing more than one reactive epoxy group:

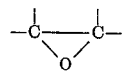

in their molecule. The polyepoxides may be saturated or unsaturated; aliphatic, cycloaliphatic, aromatic or heterocyclic, and may be substituted with non-interfering substituents. The polyepoxides may be either monomeric or polymeric. The epoxy may be either present as a terminal or interior group.

In referring to polyepoxides, reference is made to their epoxy equivalent weight. The term "epoxy equivalent weight" refers to weight of polyepoxide containing an equivalent of epoxide. The epoxy functionality is obtained by dividing the average molecular weight of the polyepoxide by the epoxy equivalent weight. Values for epoxy terms discussed above are based on data obtained by heating a weighed sample of the polyepoxide with an excess of 0.2 N pyridinium chloride in chloroform solution at the boiling point under reflux for two hours whereby the pyridinium hydrochloride hydrochlorinates the epoxy groups to chlorohydrin groups. After cooling, the excess pyridinium chloride is back-titrated with 0.1 N sodium hydroxide in methanol to the phenolphthalein end point. If the polyepoxides are single monomeric compounds having all their epoxide groups intact, their epoxy functionality will be whole numbers such as 2, 3, 4, 5, etc., per each polyepoxide molecule. In the case of polymeric polyepoxides, the materials may contain some of the monomeric monoepoxides or have their epoxy groups hydrated or otherwise reacted and/or contain higher molecular weight molecules so that the epoxy functionality may be low and contain fractional values. The polymeric material may, for example, have epoxide content values such as 1.5, 1.8, etc., per each molecule.

Illustrative of the monomeric type polyepoxide compounds are the following: vinyl cyclohexene dioxide, epoxidized soybean oil, butadiene dioxide, 1,4-bis(epoxy-propoxy)benzene, 1,3-bis(2,3-epoxy-propoxy)benzene, 4,4'-bis(2,3-epoxy-propoxy)diphenylether, 1,8-bis(2,3-epoxy-propoxyoctane, 1,4-bis(2,3-epoxy-propoxy)cyclohexane, 4,4'-bis(2-hydroxy-3,4-epoxybutoxy)diphenyldimethylmethane, 1,3-bis(4,5-epoxypentoxy)5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene, 1,2,5,6-diepoxy-3-hexyne, 1,2,5,6-diepoxyhexane and 1,2,3,4-tetra-(2-hydroxy-3,4-epoxybutoxy)butane.

Other compounds of this type include the glycidyl polyethers of polyhydric phenols obtained by reacting a mixture containing a molar amount of a polyhydric phenol with a stoichiometric excess, i.e. 3 to 6 moles per each phenolic hydroxyl group, of an epihalohydrin in an alkaline medium, and also glycidyl polyesters of polycarboxylic acids obtained by reacting epihalohydrin with an acid salt of polycarboxylic acids. Aryl polycarboxylic acids such as phthalic, isophthalic and terephthalic may also be used to react with an epihalohydrin.

Among such monomeric polyglycidyl ethers and esters may be mentioned the diglycidyl ether of bis(4-hydroxyphenyl)-dimethylmethane and the diglycidyl ether of bis(4-hydroxy-phenyl)-methane, diglycidyl ester of adipic acid, and diglycidyl ester of phthalic acid.

Other polyhydric phenols that can be reacted with an epihalohydrin include the mononuclear polyhydric phenols such as resorcinol and pyrogallol, the di- or polynuclear phenols such as the bisphenols described in the Bender et al. Patent 2,506,486 and the polyphenylols such as novolak condensation products of a phenol and a saturated or unsaturated aldehyde containing an average of from 3 to 20 or more phenylol groups per molecule (cf. Book of T. S. Carswell—"Phenoplasts," published in 1947 by Interscience Publishers of New York). Exemplary of suitable polyphenols derived from a phenol and an unsaturated aldehyde such as acrolein are the triphenylols, pentaphenylols, and heptaphenylols, described by Alford G. Farnham in U.S. Patent No. 2,801,989.

The phenols may contain alkyl, aryl or halogen ring substituents. These compounds are exemplified by the alkyl resorcinols, the tribromo resorcinols and the substituted diphenols of the Bender et al. Patent 2,506,486.

Examples of the polymeric type polyepoxides include the glycidyl polyethers of polyhydric phenols obtained by reacting, preferably in an alkaline medium, a polyhydric phenol and 1-2 moles of epichlorohydrin per each phenolic hydroxyl group. Illustrative of this particular type compound in the polyether obtained on reacting 1 mole of bis(4-hydroxy-phenyl)-dimethylmethane with 1.5 moles of epichlorohydrin in the presence of an alkaline catalyst. Polyglycidyl methacrylate resins are also satisfactory for curing with the catalyst of my invention.

Usually, the hexamethylenetetramine is used to catalyze the reaction between a polyepoxide and a so-called hardening agent.

Among suitable hardening agents for polyepoxide compositions are compounds containing reactive hydrogen, such as polyhydric phenols, illustrated by 2,2-bisphenolpropane and novolak resins. Also suitable are acid anhydrides such as hexahydrophthalic acid anhydride, chlorendic anhydride and methyl nadic anhydride. The hardeners are generally used in a stoichiometric amount. It is to be understood, however, that hardeners may be used in amounts ranging from about 80 percent to 150 percent of the stoichiometric amount with good results. The actual amount used will depend on the particular composition which is to be hardened and the temperature to which the composition is subjected. For purposes of stoichiometric calculations one epoxy group is considered to react with one reactive hydrogen.

The amount of hexamethylenetetramine catalyst is usually less than a stoichiometric amount. Generally, as little as 1/10 of 1 percent based on the weight of the polyepoxide used is sufficient to catalyze the curing reaction in a reasonable time. Adding more than a stoichiometric amount does not materially increase the rate of the curing reaction and is economically unsound. Again, the exact amount will depend on the actual composition which is to be hardened and the temperature to which the composition is subjected.

Filler material, dyes, pigments and other modifying agents can be added to the polyepoxide compositions. The filler material improves the strength, the heat resistance and chemical resistance of the final polyepoxide product. Filler is also added as an economical measure decreasing the amount of the more expensive polyepoxide in the compositions.

The inert fillers which may be used include, among others: silica, powdered aluminum, powdered iron, powdered alumina, Portland cement, silica carbide, iron oxide, nylon and ground mica, and fibrous material.

The following examples further illustrate this invention:

EXAMPLE I

One part by weight of granulated hexamethylenetetramine per two parts by weight of Carbowax 6000, a commercial polyethylene glycol having an average molecular weight of 7000, were admixed by stirring the hexamethylenetetramine into fluid Carbowax 6000, obtained by melting the Carbowax at a temperature of 70° C. The mix was agitated, poured into a pan, allowed to cool to room temperature, and granulated to a 16-mesh particle size.

EXAMPLE II

Two parts by weight of the catalyst system of Example I was admixed with 20 parts by weight of an epoxidized novolak, 10 parts by weight of a phenolic hardener, 1 part by weight of calcium stearate, 2 parts by weight of nigrosine (an aniline black) and 65 parts by weight of silica.

The novolak, having a molecular weight of 600, was prepared by condensing 100 parts of phenol with 72 parts of a 37 percent aqueous formalin solution in the presence of a catalytic amount of oxalic acid. The condensate was dehydrated to a solid product and ground into a powder. The novolak was epoxidized by feeding to a still containing a stoichiometric excess of epichlorohydrin, and also containing a small amount of ethyl alcohol. The mixture was heated to a temperature of between 60°–65° C., and held at this temperature until all of the novolak resin had dissolved. Catalytic amount of caustic soda was then added to the mix whereby the epichlorohydrin and novolak reacted to form the epoxidized novolak. Sodium chloride formed in the reaction was filtered off and the filtrate distilled to eliminate the volatiles from the epoxidized novolak. The epoxy equivalent weight of the epoxidized novolak was about 220.

The phenolic hardener was a solid, grindable novolak resin having a molecular weight of about 650 and was prepared by condensing 100 parts of phenol with 73 parts of a 37 percent aqueous formalin solution in the presence of a catalytic amount of oxalic acid. The condensate solution was neutralized with lime, and the water driven off by dehydration and distillation.

The mixture comprising the catalyst of Example I, the epoxidized novolak, the phenolic hardener, silica filler, calcium stearate, and nigrosine were blended together in a ribbon-type mixer. The mix was thereafter compounded in a differential speed two roll mill for two minutes. The front roll was kept at a temperature of between 170°–180° F.; the rear roll at a temperature of between 220–230° F. The material was pulled off the roll mill in the form of a sheet, allowed to cool at room temperature, ground to a 16-mesh particle size and the fines removed.

The molding composition of Example II was subjected to a "cup closing time" test to determine whether or not the composition had a satisfactory storage life. This test consists in molding a two inch ASTM D–731–50 cup with a 2.0 percent fixed overcharge at a fixed pressure of 10,000 p.s.i. The time required for the press to close from a flash thickness of 50 mils to 6 mils is measured. A longer cup closing time indicates that the composition has advanced more closely to an infusible, unworkable state. A composition which reaches an infusible, unworkable state in a short time has an unsatisfactory storage life.

Cup closing time values of a polyepoxide composition containing the latent catalyst were determined and compared to cup closing time values of polyepoxide compositions containing other catalyst systems. The data is tabulated, as follows, wherein the cup closing time values were determined at the end of the storage intervals directly opposite therefrom.

EXAMPLE III

*Composition of Example II*

| Days stored at 37.8° C.: | Time in seconds |
|---|---|
| 0 | 1.8 |
| 3 | 2.4 |
| 4 | 3.5 |
| 5 | 3.8 |
| 6 | 3.7 |
| 7 | 3.7 |
| 10 | 6.7 |
| 11 | 6.5 |
| 12 | 6.8 |
| 13 | 6.8 |
| 14 | 6.7 |
| 21 | 7 |

At the end of 21 days the composition was still fusible.

As opposed to this, a composition was prepared according to the process of Example II and comprised 20 parts by weight of the epoxidized novolak of Example II, 10 parts by weight of the phenolic hardener of Example II, 66 parts by weight of silica filler, 1 part by weight of calcium stearate, 1 part by weight of hexamethylenetetramine, and 2 parts by weight of nigrosine. The "cup closing time" of the composition was determined and is tabulated, below.

| Days stored at 37.8° C.: | Time in seconds |
|---|---|
| 2.5 | 2.5 |
| 3 | 5 |
| 4 | 5.7 |
| 5 | 6.7 |
| 6 | 7.4 |
| 7 | 7 |
| 10 | 14.5 |

The "cup closing time" of this composition at the end of ten days was 14.5 seconds, over twice that of the composition of Example II which contained our catalyst system. A longer "cup closing time" indicates that the composition had advanced more closely to an infusible, unworkable product and has a relatively shorter storage life.

A second composition was also prepared according to the process described in Example II, and comprised 22 parts by weight of the epoxidized novolak of Example II, 11 parts by weight of a silica filler, 2 parts by weight of stearic acid, and 1 part by weight of triethanol amine. This composition was also subjected to the "cup closing time" test. The data obtained is tabulated, as follows:

| Days stored at 37.8° C.: | Time in seconds |
|---|---|
| 0 | 1.5 |
| 1 | 2.0 |
| 2 | 4.7 |
| 5 | 10.7 |
| 6 | 12.1 |

This composition became infusible during the "seventh" day and, therefore, had a short storage life.

Polyepoxide compositions containing our latent catalyst not only have a long storage life but are also cured rapidly once the barrier polyethylene glycol coating is made discontinuous, usually under the influence of heat and the hexamethylenetetramine is free to catalyze the reaction between the reactive components of the composition.

In order to more fully illustrate the satisfactory cure speed of our catalyst system, the cure speed of polyepoxide compositions containing our catalyst was determined by the apparent modulus of elasticity test which consists in molding a bar of material having dimensions of 1 inch by ⅛ inch by 5 inches, under a molding pressure of 2,000 p.s.i., at a temperature of 175° C. and a cure time of 4 minutes. The bar was maintained at the molding temperature and a load placed at the middle of the bar.

The apparent modulus of elasticity (E) is calculated from the expression:

$$E = \frac{Fh^3}{4 \cdot D \cdot W \cdot T}$$

where F is the applied load in pounds; h is the length of the span under stress expressed in inches; D is the deflection in inches; W and T are the width and thickness of the bar, respectively, in inches.

A material which cures rapidly to an infusible, unworkable product has less deflection and consequently a larger (E) value. An (E) value of about 30,000 pounds per square inch indicates that the composition has a satisfactory cure speed.

The following tabulated data shows clearly that the cure speed of a polyepoxide composition containing the latent catalyst system of my invention has a satisfactory cure speed.

EXAMPLE IV

| Composition | Molding Temperature, °C. | Cure Time, min. | (E) in Pounds per Square Inch |
|---|---|---|---|
| Composition of Example II (contains the catalyst of my invention) | 175 | 4 | 30,000 |

The polyepoxide compositions are of particular value as casting resins, potting compounds and adhesive binders. These compositions also find use as laminating resins and as surface coatings or finishes, and as molding compositions.

What is claimed is:

1. A polyepoxide composition containing a polyepoxide having an average of more than one epoxy group per molecule wherein each epoxy oxygen atom is attached to vicinal carbon atoms, and a latent acting catalyst composed of granulated hexamethylenetetramine coated with a solid polyethylene glycol, said coated catalyst being present in said composition in an amount of at least about 1/10 of 1 percent by weight based on the weight of said polyepoxide.

2. A polyepoxide composition as defined in claim 1 wherein the polyethylene glycol has an average molecular weight of about 6,000.

3. A polyepoxide composition as defined in claim 1 wherein the said polyepoxide is an epoxidized phenol-formaldehyde condensate.

4. A polyepoxide composition containing a polyepoxide having an average of more than one epoxy group per molecule wherein each epoxy oxygen atom is attached to vicinal carbon atoms, a latent acting catalyst composed of hexamethylenetetramine coated with a solid polyethylene glycol, said coated catalyst being present in said composition in an amount of at least about 1/10 of 1 percent by weight based on the weight of said polyepoxide, and a hardening agent for said polyepoxide, said hardening agent being present in said composition in at least about a stoichiometric amount.

5. A composition as defined in claim 4 wherein the said hardening agent is a phenol-formaldehyde novolak resin.

6. A polyepoxide composition containing a polyepoxide having an average of more than one epoxy group per molecule wherein each epoxy oxygen atom is attached to vicinal carbon atoms, a latent acting catalyst composed of granulated hexamethylenetretramine coated with a solid poleythylene glycol, said coated catalyst being present in said composition in an amount of at least about 1/10 of 1 percent by weight based on the weight of said polyepoxide, and a hardening agent for said polyepoxide, said hardening agent being present in said composition in an amount of from about 80 percent to 150 percent of stoichiometric.

References Cited in the file of this patent

UNITED STATES PATENTS

| | | |
|---|---|---|
| 2,326,984 | Tomlin | Aug. 17, 1943 |
| 2,343,835 | Smith et al. | Mar. 7, 1944 |
| 2,714,098 | Martin | July 26, 1955 |
| 2,731,444 | Greenlee | Jan. 17, 1956 |
| 2,824,083 | Parry et al. | Feb. 18, 1958 |
| 2,928,810 | Belanger | Mar. 15, 1960 |

FOREIGN PATENTS

| | | |
|---|---|---|
| 558,872 | Great Britain | Jan. 25, 1944 |
| 629,111 | Great Britain | Sept. 13, 1949 |

OTHER REFERENCES

Black et al.: Modern Plastic, December 1954, pages 139, 140 and 142 specially relied on.

Lee et al.: "Epoxy Resins," McGraw-Hill Book Company, Inc., New York, 1957. Copy in Scientific Library.

UNITED STATES PATENT OFFICE
CERTIFICATE OF CORRECTION

Patent No. 3,063,965                 November 13, 1962

William G. Colclough, Jr.

It is hereby certified that error appears in the above numbered patent requiring correction and that the said Letters Patent should read as corrected below.

Column 1, line 31, for "the", second occurrence, read -- with --; line 43, for "wih" read -- with --; column 3, line 31, for "in" read -- is --; column 6, line 56, after "of" insert -- granulated --.

Signed and sealed this 27th day of August 1963.

(SEAL)
Attest:

ERNEST W. SWIDER                 DAVID L. LADD
Attesting Officer                 Commissioner of Patents